W. J. STILL.
MANUFACTURE OF GILLED TUBULAR APPARATUS.
APPLICATION FILED APR. 11, 1912.

1,171,899.

Patented Feb. 15, 1916.
2 SHEETS—SHEET 1.

W. J. STILL.
MANUFACTURE OF GILLED TUBULAR APPARATUS.
APPLICATION FILED APR. 11, 1912.
1,171,899.
Patented Feb. 15, 1916.
2 SHEETS—SHEET 2.
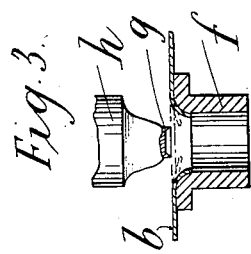
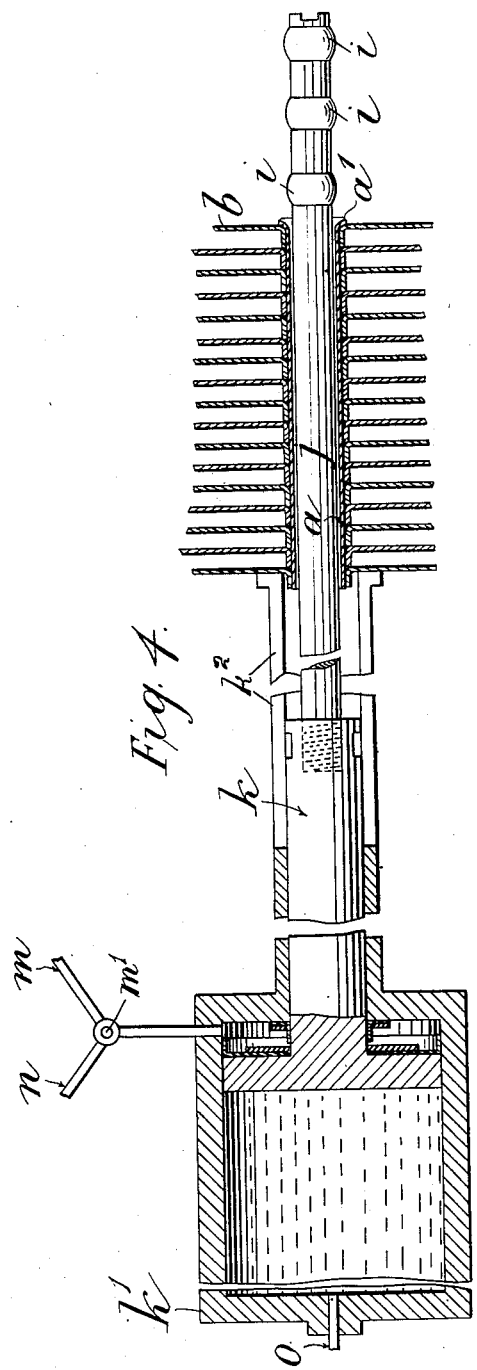

UNITED STATES PATENT OFFICE.

WILLIAM JOSEPH STILL, OF SOUTHALL, ENGLAND.

MANUFACTURE OF GILLED TUBULAR APPARATUS.

1,171,899.      Specification of Letters Patent.      Patented Feb. 15, 1916.

Application filed April 11, 1912. Serial No. 690,212.

*To all whom it may concern:*

Be it known that I, WILLIAM JOSEPH STILL, a subject of the King of Great Britain and Ireland, residing at Southall, in the county of Middlesex, England, have invented Improvements in or Relating to the Manufacture of Gilled Tubular Apparatus, of which the following is a specification.

This invention relates to the manufacture of that class of apparatus for transmitting heat from one fluid to another which comprises flanged gills or plates secured exteriorly to a duct by expansion of the latter into intimate contact with the gills or plates.

The object of the invention is to provide an improved method of manufacture which consists in first flaring the flanges at their junction with the gills, assembling the gills upon the tubes so that the free ends of the flanges on one gill enter the flared portions of the flanges of another gill leaving annular jointing recesses or zones around the tubes, introducing a fusible mixture in powdered condition between the gills when these are in a substantially horizontal position, vibrating the assembled parts so as to cause the fusible mixture to creep into the jointing recesses or zones and thereafter applying heat to melt the fusible mixture.

Figure 1:
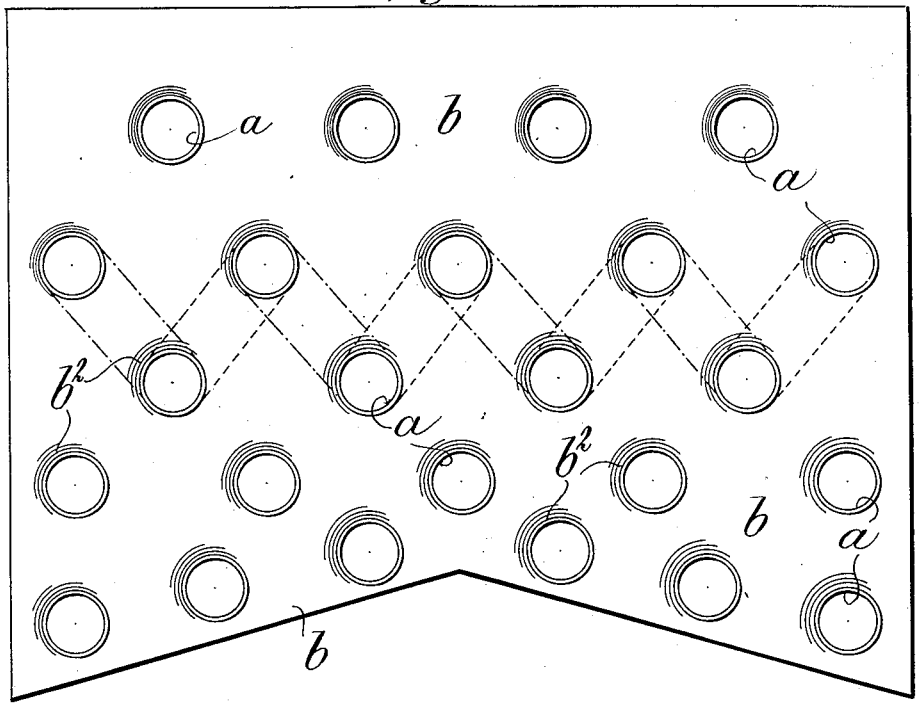
Figure 2:
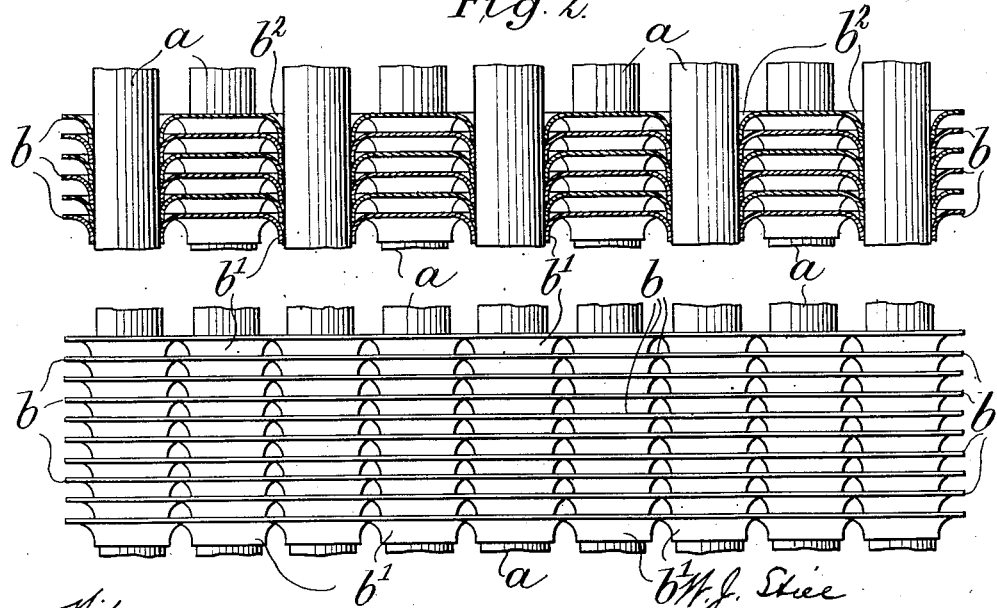

In the accompanying drawings, Figure 1 is an elevation and Fig. 2 a plan partly in horizontal section, of one construction of apparatus constructed according to the invention and comprising tubes and gills or plates secured thereto such apparatus being suitable for use as a water heater. Fig. 3 is a sectional elevation of means for forming the holes in the plates to be secured to a duct. Fig. 4 is a view partly in section and more or less diagrammatic of a gilled tube and means to be used in its manufacture.

The apparatus shown in Figs. 1 and 2 comprises a number of tubes $a$ passing through and secured to a number of plates $b$ arranged a short distance apart, the whole forming an apparatus suitable for heating water that is passed through the tubes $a$ which, as well as the plates $b$ are heated by hot gas flowing upward through the passages between the plates.

The means shown in Fig. 3 for forming the holes in the plates $b$ for the reception of the tubes $a$, comprise a bolster $f$ and a tool in the form of a punch $g$ and stamp $h$. The punch $g$ has no companion sheer bed as ordinarily, the arrangement being such that the plate is partly shaped before the metal for the hole is removed by the punch, which afterward takes place, the continued movement of the tool completing the shape, as will be understood from the said figure. In this way the flanged holes are made trumpet shape as shown. By the formation of the flanged holes in the manner described, when the several plates $b$ are placed on the tubes $a$ as shown in Fig. 2 with the flanged edges $b^1$ of the holes in one plate extending into the trumpet shaped holes in an adjacent plate an annular recess or jointing zone $b^2$ is formed between each flanged edge and the adjacent tube specially adapted for the reception of jointing material as hereinafter described.

Heretofore in the manufacture of apparatus of the kind referred to embodying one or more tubes of thin metal expanded into the flanged holes of a number of gills or plates it has been customary to hold the tube at the end remote from that at which the expander commences to travel but according to the present invention that end only of the tube $a$ (Fig. 4) or each tube in turn, at which the expansion commences, is, anchored to the corresponding end gill or plate $b$ of the set of gills or plates to be secured to the tube and the resistance to the passage of the expander through the tube is transmitted through the flanged edges $b^1$ of the holes in the said set of gills or plates in a longitudinal direction by anchoring or rigidly supporting the opposite extreme end of such set. By this means the metal of the tube is always in tension and the excess of the metal, due to elongation, is free to protrude beyond the set of gills or plates while at the same time the flanged edges $b^1$ of the holes in the gills or plates $b$ are pressed closely into contact with one another. The expanding of the tubes may be effected by means of a tool comprising a series of spherical devices $i$ of gradually increasing diameter formed upon a rod $j$ that may conveniently be passed through the tube $a$ to be expanded and then screwed into the rod of a hydraulic ram $k$ moved in operative direction by water supplied to the cylinder $k^1$ through a valve $m^1$ from a main at $m$ and in the opposite direction, when an exhaust $n$ is opened, by the valve, by water that is displaced from the cylinder into a raised tank or receiver through a pipe $o$ during the operation of the ram. In order to resist longitudinal movement of the tube $a$ while being expanded, the end of the tube may be upturned or flanged as shown at $a^1$ to engage the outer plate $b$ the set of tubes and plates being supported against the pull of the expanding tool by a tubular distance piece $k^2$, acting through the flanged edges $b^1$ of the holes in the plates as shown. As will be seen by the arrangement described the tube will be gradually expanded along its length when the spherical expanding devices are drawn through it.

After the plates and tubes have been assembled and firmly united by expanding the tubes as described, the solder and flux or brazing mixture preferably used for uniting the parts together, may in some cases, as in apparatus shown in Figs. 1 and 2, and after arranging the plates horizontal, be placed in powdered condition between the plates in excess and the assembled plates and tubes subjected to a vibrating or shaking motion so as to cause the powdered jointing material to fill the recesses or jointing zones $b^2$ in the plates around each tube wherein it will be retained, the vibrating or shaking motion being continued until, after shutting off the supply of the jointing material, the excess thereof is removed from the plates after which heat is applied to melt the jointing mixture and thereby finally unite the plates and tubes. The melting of the solder and flux or brazing mixture may conveniently be effected by connecting the tubes in series with a circuit including an air heater and a fan and circulating heated air at a high velocity through the tubes.

What I claim is:—

The herein described steps in the manufacture of apparatus embodying tubes expanded into intimate contact with flanged gills, through which they extend, which consists in first flaring the flanges of the holes at their junction with the gills, assembling the gills upon the tubes so that the free ends of the flanges on one gill enter the flared portions of the flanges of another gill leaving adjacent annular jointing recesses or zones around the tubes, introducing a fusible mixture in powdered condition between the gills when these are in a substantially horizontal position, vibrating the assembled parts so as to cause the fusible mixture to creep into the jointing recesses or zones and thereafter applying heat to melt the fusible mixture.

Signed at London England this 2nd day of April 1912.

WILLIAM JOSEPH STILL.

Witnesses:
    CHARLES COPS,
    H. D. JAMISON.